C. E. LOYD.
AUXILIARY WINDSHIELD.
APPLICATION FILED JUNE 4, 1919.
1,356,213.
Patented Oct. 19, 1920.
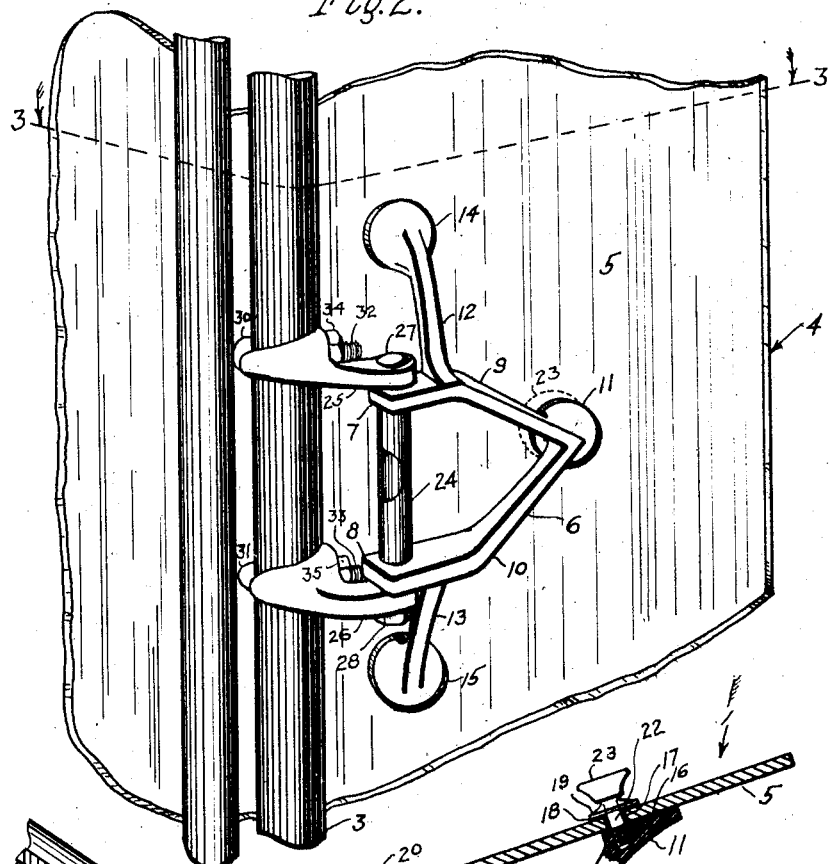
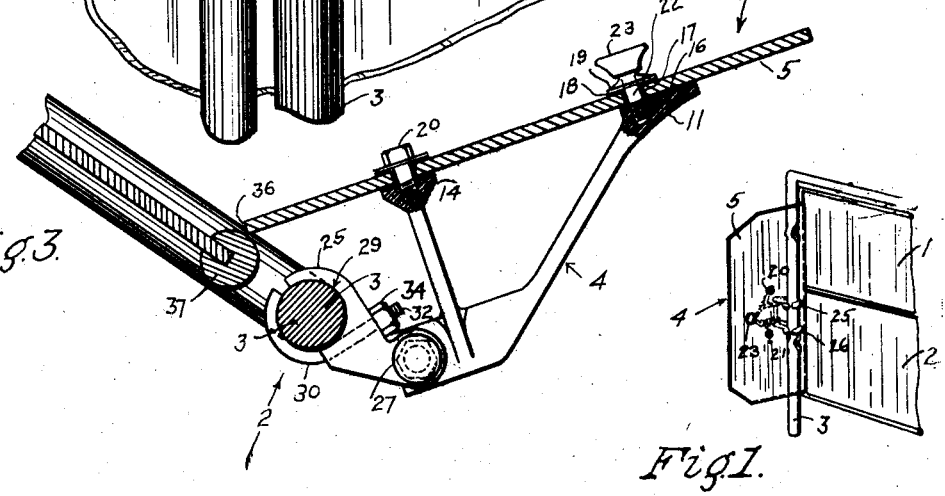
INVENTOR.
CLARENCE E. LOYD
BY
ATTORNEY.

UNITED STATES PATENT OFFICE.

CLARENCE E. LOYD, OF LOS ANGELES, CALIFORNIA, ASSIGNOR OF ONE-FOURTH TO CHARLES I. DECKER, ONE-FOURTH TO JOSEPH H. PECO, AND ONE-FOURTH TO FRED GIDDING, ALL OF LOS ANGELES, CALIFORNIA, AND ONE-FOURTH TO JOHN STIDEL, OF APPLETON, WISCONSIN.

AUXILIARY WINDSHIELD.

1,356,213.  Specification of Letters Patent.  Patented Oct. 19, 1920.

Application filed June 4, 1919. Serial No. 301,777.

*To all whom it may concern:*

Be it known that I, CLARENCE E. LOYD, a citizen of the United States, residing at Los Angeles, in the county of Los Angeles and State of California, have invented new and useful Improvements in Auxiliary Windshields, of which the following is a specification.

My object is to make an improved auxiliary wind shield, and my invention consists of the novel features herein shown, described and claimed.

Figure 1 is a fragmentary perspective of the main windshield showing an auxiliary wind shield embodying the principles of my invention in use, the view being taken from the rear and looking in the direction indicated by the arrow 1 in Fig. 3.

Fig. 2 is an enlarged fragmentary perspective from the front and seen looking in the direction indicated by the arrow 2 in Fig. 3.

Fig. 3 is a fragmentary horizontal section as on the line 3—3 of Fig. 2 and looking downwardly as indicated by the arrows.

The main wind shield panels 1 and 2 are mounted to swing in the main wind shield frame having a side bar 3, and the auxiliary wind shield 4 is connected to the side bar 3.

The details of the auxiliary wind shield 4 are as follows: The body of the auxiliary wind shield is a heavy glass plate 5. The supporting frame 6 comprises parallel bearings 7 and 8, arms 9 and 10 extending from the bearings 7 and 8, an attaching plate 11 at the opposite ends of the arms 9 and 10 from the bearings 7 and 8, arms 12 and 13 extending laterally from the junctions between the arms 9 and 10 and the bearings 7 and 8, and the attaching plates 14 and 15 at the outer ends of the arms 12 and 13. The arms 9, 10, 12 and 13 are all inclined so as to bring the bearings 7 and 8 a considerable distance away from the plate 5. The attaching plates 11, 14 and 15 are all in the same plane so as to fit against the plate 5.

Bolt holes are bored through the plate 5, non-metallic cushions 16 are placed against the faces of the attaching plates 11, 14 and 15, rubber tubes 17 are inserted through the holes in the glass, non-metallic washers 18 are placed against the opposite side of the glass from the cushions 16, metal washers 19 are placed against the soft washers 18, cap screws 20 and 21 are inserted through the plate 5 and tapped into the attaching plates 14 and 15, and a cap screw 22 is inserted through the plate 5 and tapped into the attaching plate 11, the head of the cap screw 22 being shaped to form a knob or handle 23.

A spacing collar 24 is placed between the bearings 7 and 8, clamping jaws 25 and 26 are placed against the bearings 7 and 8, a bolt 27 is inserted through the heads of the clamping jaws 25 and 26 through the bearings 7 and 8 and through the spacing collar 24, and a nut 28 is placed upon the bolt so that by tightening the nut the bearings 7 and 8 are pressed against the spacing collar 24 and the clamping jaws 25 and 26 are pressed against the bearings 7 and 8 to make a stiff joint. The spacing collar 24 serves to hold the bearings 7 and 8 from bending toward each other.

The clamping jaws 25 and 26 have semi-circular faces 29 to fit the side bar 3. The clamping jaws 30 and 31 are formed by bending the ends of the bolts 32 and 33 to semicircles to fit the opposite sides of the side bar 3 from the jaws 25 and 26. The bolts 32 and 33 are inserted through the bodies of the clamping jaws 25 and 26 and nuts 34 and 35 are applied, so that by tightening the nuts 34 and 35 the clamping jaws 30 and 31 are moved toward the clamping jaws 25 and 26 to pinch the side bar 3 and mount the auxiliary wind shield 4 upon the side bar 3.

By manipulating the nuts 34 and 35 the clamping jaws 25 and 26 may be adjusted up and down or around the side bar 3, and by tightening the nuts the side bar 3 is rigidly gripped.

By manipulating the nut 28 the plate 5 may be turned upon the bolt 27 to adjust the position of the plate 5 relative to the main wind shield panels 1 and 2, and then by tightening the nut the plate 5 is held rigidly in its adjusted position.

The plate 5 is thus adjustably mounted relative to the main wind shield by a fitting having three points of contact with the plate, that is the attaching plates 11, 14, and 15 and the fitting having a single hinge pin, that is the bolt 27 and two simple clamps of which the jaws 25 and 26 are a part.

In the adjustment shown in Fig. 3 the inner edge 36 of the plate 5 fits against the secondary side bar 37 of the panel 1, so that the plate 5 forms a side wing which is practically a continuation of the panel 1.

Various changes may be made without departing from the spirit of my invention as claimed.

I claim:

1. An improved auxiliary wind shield comprising parallel bearings, arms extending from the bearings, an attaching plate at the outer ends of the arms, arms extending laterally from the junctions between the first arms and the bearings, attaching plates at the outer ends of the lateral arms, a glass plate fitting against the attaching plates, bolts inserted through the glass plate and tapped into the attaching plates, clamping jaws fitting the bearings, a bolt inserted through the clamping jaws and through the bearings and adapted to make a stiff joint, and bolts inserted through the clamping jaws and having hooked ends, there being semicircular faces upon the clamping jaws in opposition to the hooked ends, said clamping jaws and hooked ends being adapted to embrace and grip the side bar of a main wind shield.

2. An auxiliary windshield including a pair of bearings, a pair of arms extending from said bearings and connected at their outer ends, arms extending laterally from the junction between said first arms and said bearings, a glass plate, means for attaching said glass plate to the outer ends of said arms, clamping jaws fitting said bearings, a bolt extending through said clamping jaws and through said bearings, a nut on one end of said bolt engaging one of said clamping jaws to make a rigid joint between said clamping jaws and said bearings, said clamping jaws being adapted to embrace the side bar of a main windshield, hook-shaped bolts embracing said side bar and extending through said jaws, and nuts on the ends of said bolts engaging said jaws for clamping said jaws on said bar.

In testimony whereof I have signed my name to this specification.

CLARENCE E. LOYD.